(12) United States Patent
Ishizaki et al.

(10) Patent No.: US 10,563,660 B2
(45) Date of Patent: Feb. 18, 2020

(54) BLOWER MOTOR UNIT FOR AIR CONDITIONER

(71) Applicant: KEIHIN CORPORATION, Tokyo (JP)

(72) Inventors: Masaaki Ishizaki, Sakura (JP); Masashi Ueda, Sendai (JP)

(73) Assignee: KEIHIN CORPORATION, Tokyo (JP)

( * ) Notice: Subject to any disclaimer, the term of this patent is extended or adjusted under 35 U.S.C. 154(b) by 399 days.

(21) Appl. No.: 15/652,538

(22) Filed: Jul. 18, 2017

(65) Prior Publication Data

US 2018/0023580 A1     Jan. 25, 2018

(30) Foreign Application Priority Data

Jul. 22, 2016   (JP) ................................ 2016-143880
Jul. 22, 2016   (JP) ................................ 2016-143903

(51) Int. Cl.
*H02K 9/06*     (2006.01)
*F04D 25/08*     (2006.01)
*H02K 9/02*     (2006.01)
*H02K 5/20*     (2006.01)

(52) U.S. Cl.
CPC ............. *F04D 25/082* (2013.01); *H02K 5/20* (2013.01); *H02K 9/02* (2013.01); *H02K 9/06* (2013.01); *H02K 2211/03* (2013.01)

(58) Field of Classification Search
CPC .......... F04D 25/082; H02K 5/20; H02K 9/02; H02K 9/06; H02K 2203/03; H02K 2211/03
See application file for complete search history.

(56) References Cited

U.S. PATENT DOCUMENTS 6,107,708 A    8/2000   Yamaguchi et al.
2006/0024170 A1*   2/2006   Foulonneau .......... F04D 25/082
                                                                          417/47

FOREIGN PATENT DOCUMENTS

DE    20 2016 101 878     6/2016
JP        11-332203     11/1999
JP        2015-080301     4/2015

OTHER PUBLICATIONS

Chinese Office Action dated Apr. 19, 2019, Application No. 201710599588.0, English translation included, 15 pages.

* cited by examiner

Primary Examiner — Ramon M Barrera
(74) Attorney, Agent, or Firm — Rankin, Hill & Clark LLP

(57) ABSTRACT

A support plate is accommodated in the interior of a casing, the support plate having a bearing member that rotatably supports a rotating shaft of a brushless motor, together with supporting a circuit substrate on which a control circuit is provided. The casing is constituted by combining a lower side half body and an upper side half body. A second flow passage through which cooling air (air) is allowed to flow is formed in the lower side half body, and a protrusion is provided therein, which serves as a guide member for guiding the cooling air toward the side of (a first flow passage of) the upper side half body.

9 Claims, 7 Drawing Sheets

BLOWER MOTOR UNIT FOR AIR CONDITIONER

CROSS-REFERENCE TO RELATED APPLICATIONS

This application is based upon and claims the benefit of priority from Japanese Patent Applications No. 2016-143880 filed on Jul. 22, 2016, and No. 2016-143903 filed on Jul. 22, 2016, the contents all of which are incorporated herein by reference.

BACKGROUND OF THE INVENTION

Field of the Invention

The present invention relates to a blower motor unit for an air conditioner having a casing in which a brushless motor and a circuit substrate are accommodated.

Description of the Related Art

In a vehicular air conditioning device, a blower fan is rotated under the action of a brushless motor that makes up an air conditioner blower motor unit, whereby blowing of air is carried out. As one example of such an air conditioner blower motor unit, there may be cited the blower motor unit disclosed in Japanese Laid-Open Patent Publication No. 11-332203.

In the air conditioner blower motor unit disclosed in Japanese Laid-Open Patent Publication No. 11-332203, a magnetic sensor is provided in the vicinity of a lower end portion of a rotating shaft of a brushless motor, together with a Hall element being provided on a circuit substrate having an insertion hole formed therein through which the rotating shaft is inserted. With such a configuration, by detecting with the Hall element a magnetic flux of the sensor magnet, the angle of rotation of the rotor that makes up the brushless motor is detected. Based on such a detection result, the excitation current supplied to the stator is controlled.

In contrast thereto, as disclosed in Japanese Laid-Open Patent Publication No. 2015-080301, an air conditioner blower motor unit is also known in which a magnet sensor and a Hall element are not used. Such an air conditioner blower motor unit includes a stator base on which the stator of a brushless motor is retained, and in which a cooling air introduction path is formed through which cooling air passes. A circuit substrate is connected to the stator base through a partition plate made of resin. More specifically, the circuit substrate is supported by the stator base under a condition in which the partition plate is interposed between the circuit substrate and the stator base.

In the above configuration, control of the brushless motor is carried out by a control circuit, which is accommodated together with the brushless motor in the interior of a casing. The control circuit is constituted by electrically connecting predetermined electronic components with respect to the circuit substrate, and when the brushless motor is controlled, the electronic components are energized with electrical current.

Accompanying such energization, the circuit substrate takes on heat. As disclosed in Japanese Laid-Open Patent Publication No. 2015-080301, such heat is transmitted to a heat sink, and by cooling air coming into contact with the heat sink, the heat is dissipated. Through the above process, heat is removed from the circuit substrate. In other words, the circuit substrate is cooled.

SUMMARY OF THE INVENTION

With the air conditioner blower motor units disclosed in Japanese Laid-Open Patent Publication No. 11-332203 and Japanese Laid-Open Patent Publication No. 2015-080301, the circuit substrate is disposed in an overlapping manner with the axis of rotation as viewed in plan. For this reason, the size of the casing in which the brushless motor is accommodated is increased along the axial direction of the rotating shaft (the thickness direction of the casing). More specifically, with either of the conventional techniques described above, it is difficult to achieve a reduction in size and scale of the air conditioner blower motor unit.

In addition, with the conventional technique of Japanese Laid-Open Patent Publication No. 11-332203, as can be appreciated from FIG. 1 of this document, cooling air, which is generated by the blower fan and flows into a diverting duct, is unlikely to come into contact with the heat sink. Accordingly, it is difficult for the circuit substrate to be cooled by the cooling air. On the other hand, even in the conventional technology disclosed in Japanese Laid-Open Patent Publication No. 2015-080301, since the partition plate is interposed between the circuit substrate and the stator base on which the heat sink is formed, it can be considered difficult for the circuit substrate to be cooled. This is because transfer of heat from the circuit substrate is blocked by the partition plate.

Furthermore, in Japanese Laid-Open Patent Publication No. 2015-080301, since the partition plate, which is made of resin, is interposed between the circuit substrate and the stator base on which the heat sink is formed, it can be considered difficult for the circuit substrate to be cooled. This is because transfer of heat from the circuit substrate is blocked by the partition plate. Accordingly, while these techniques are adopted, in order to efficiently cool the circuit substrate, it is essential for the heat dissipating area of the heat sink to be enlarged. In essence, in this case, it is difficult to efficiently cool the circuit substrate while also minimizing the scale of the air conditioner blower motor unit.

A principal object of the present invention is to provide a blower motor unit for an air conditioner which can be made smaller in scale.

Another object of the present invention is to provide a blower motor unit for an air conditioner, which is capable of efficiently cooling a circuit substrate.

According to an embodiment of the present invention, a blower motor unit for an air conditioner is provided, comprising a brushless motor adapted to rotate a blower fan constituting part of an air conditioning device, a circuit substrate on which a control circuit adapted to control the brushless motor is provided, a support plate having a bearing member that rotatably supports a rotating shaft of the brushless motor, together with supporting the circuit substrate, a heat dissipating member provided on the support plate and which is capable of dissipating heat of the circuit substrate, and a casing, which is constituted by combining a first casing member and a second casing member, and in which the brushless motor, the circuit substrate, the heat dissipating member, and the support plate are accommodated. In the blower motor unit, an air introduction port, a rotating shaft insertion opening through which the rotating shaft is passed, and a first flow passage for causing an air introduced from the air introduction port to flow to at least the brushless motor and the heat dissipating member are formed in the first casing member, a second flow passage through which the air introduced from the air introduction port is allowed to flow is formed in the second casing member, and a guide member that is adapted to guide the air from the second flow passage to the first flow passage is provided in the second casing member, and the guide member is a protrusion that faces toward the heat dissipating member, and protrudes toward the side of the first casing member.

In the present invention, since the circuit substrate is supported on the support plate, a partitioning member is not interposed between the circuit substrate and the support plate. Accordingly, heat from the circuit substrate is transferred rapidly to the support plate. Therewith, the circuit substrate is cooled highly efficiently.

Consequently, there is no particular need to increase the heat dissipating area of the heat dissipating member. Therefore, it is possible to reduce the size of the air conditioner blower motor unit while also improving the cooling efficiency of the circuit substrate.

Further, in the interior of the casing, the protrusion is provided, which serves as a guide member for guiding the air (cooling air) that flows through the second flow passage in the second casing member, and changing the direction of travel of the air introduced from the air introduction port toward the side of the first casing member (first flow passage). Therefore, the cooling air contacts the support plate with high efficiency. Consequently, heat from the circuit substrate, which is supported on the support plate, can be removed more rapidly through the support plate. Therewith, the circuit substrate can be cooled highly efficiently.

The support plate may be constituted from a metal material, and the heat dissipating member is disposed integrally with the support plate as a portion of the support plate. In this case, since the rigidity of the support plate is increased, it is unlikely for the support plate to resonate when the blower fan rotates. Therefore, since vibrations are suppressed and prevented from being transmitted to the casing, the casing itself is prevented from resonating. Also, since thermal conductivity of metal is superior, heat from the circuit substrate is transferred to the heat dissipating member and is rapidly dissipated.

The support plate preferably is arranged at a position in contact with the air (cooling air) in the course of flowing from the air introduction port, past the guide member, and to the rotating shaft insertion opening. This is because, in accordance with this feature, the support plate, and hence the circuit substrate, can be cooled with higher efficiency.

The support plate preferably includes a plurality of screw-engagement bosses in which threaded members are screw-engaged in order to attach the circuit substrate to the support plate, and a plurality of tongue portions that project from an outer edge portion of the support plate and serve to support the support plate into the casing. This facilitates the connection between the support plate and the circuit substrate, and thus it becomes easy to connect the support plate, to which the circuit substrate is connected, to the casing.

In this structure, at least one of the screw-engagement bosses from among the plurality of screw-engagement bosses preferably is disposed in proximity to the heat dissipating member. In this case, the threaded member is screw-engaged in the vicinity of the heat dissipating member, whereby the concerned location and the circuit substrate are placed in intimate contact. Consequently, since the heat from the circuit substrate is transmitted highly efficiently to the heat dissipating member, the circuit substrate can be cooled with greater efficiency.

Further, at least one of the tongue portions from among the plurality of tongue portions preferably is disposed at a position having a 180° phase difference with respect to the screw-engagement boss located in proximity to the heat dissipating member. Consequently, the tongue portions can be placed in positions that do not hinder the flow of air (cooling air).

Further, a ventilation hole preferably is formed in the support plate. Such a ventilation hole enables the air guided by the guide member to flow from the second flow passage to the first flow passage for allowing such air to flow through the brushless motor. Although the electromagnetic coil that makes up the brushless motor also takes on heat along with being energized in order to rotate the rotating shaft, if the ventilation hole is formed in the support plate, the cooling air flows to the interior of the brushless motor, whereby the electromagnetic coil is cooled. Therefore, the brushless motor can be cooled highly efficiently.

In addition, since the support plate is cooled, heat that is transferred from the circuit substrate to locations other than the heat dissipating member is also quickly removed. Thus, the cooling efficiency of the circuit substrate is even further enhanced.

The guide member, for example, can be provided as a protrusion that protrudes in the form of a substantially inverted V-shape toward the side of the first casing member. Such a guide member (protrusion) may be formed by providing a solid protrusion (protuberance) inside the second casing member. Alternatively, based on a perspective on the capability to reduce the weight of the second casing member, the guide member may be a protrusion having a shape in which an outer wall of the second casing is bent toward the side of the first casing member.

In the latter case, a rib may be provided on the outer wall of the second casing member corresponding to an outer surface of the guide member. In accordance with this feature, since the rigidity of the second casing member is secured, resonance of the casing in an audible range is prevented. More specifically, vibratory noise is reduced and quietness becomes superior.

A clearance preferably is formed between the support plate and the casing with a distance such that the support plate does not interfere with the casing when the rotating shaft is rotated. This is because, owing to this feature, the occurrence of contact sounds or damage to the circuit substrate can be avoided.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a blower motor unit for an air conditioner according to the present invention will be described in detail below with reference to the accompanying drawings. In the following description, the terms "upper" and "lower" correspond to upper and lower side portions in FIGS. 1 and 2.

Figure 1:
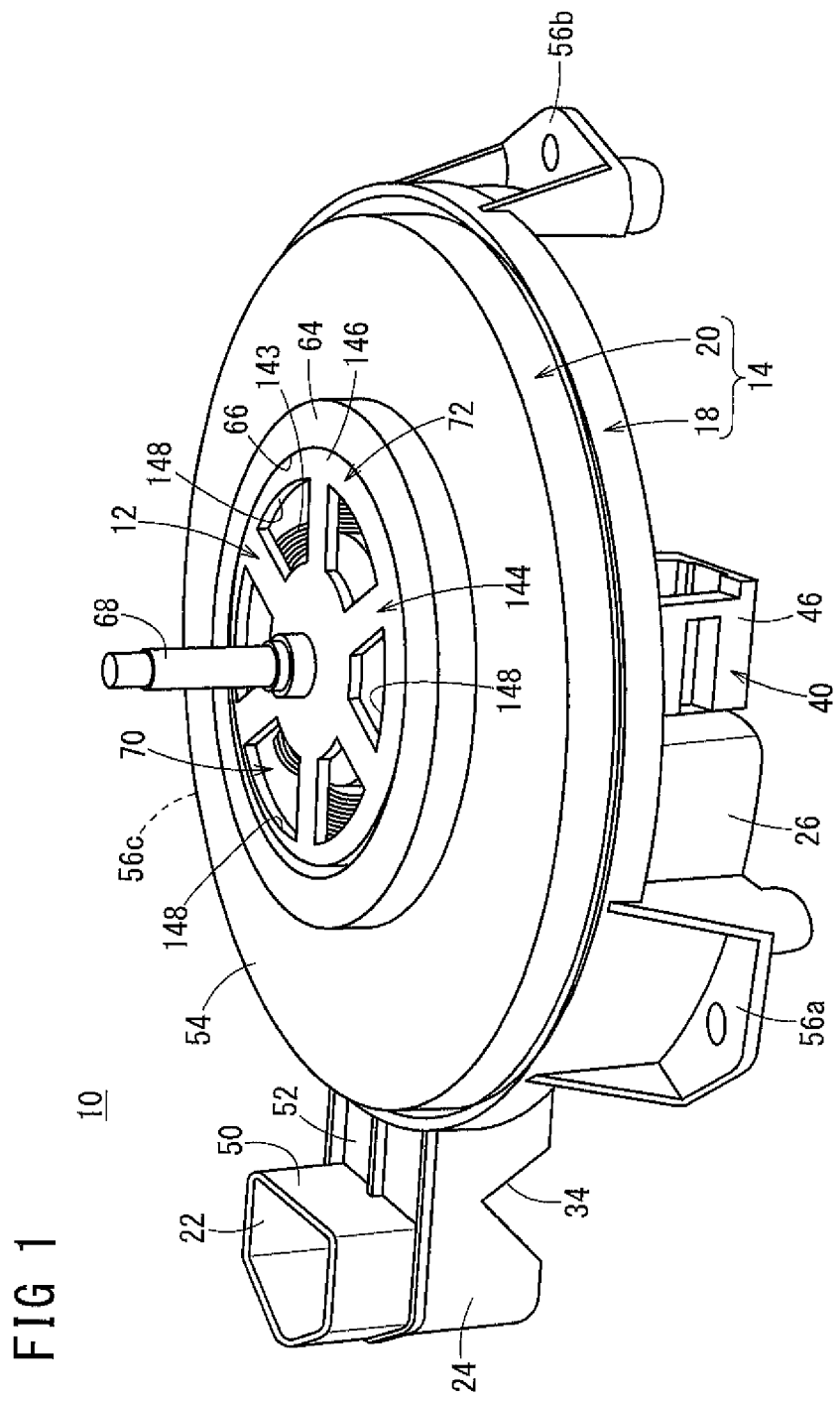
FIG. 1 is a schematic overall perspective view of an air conditioner blower motor unit according to an embodiment of the present invention.
Figure 2:
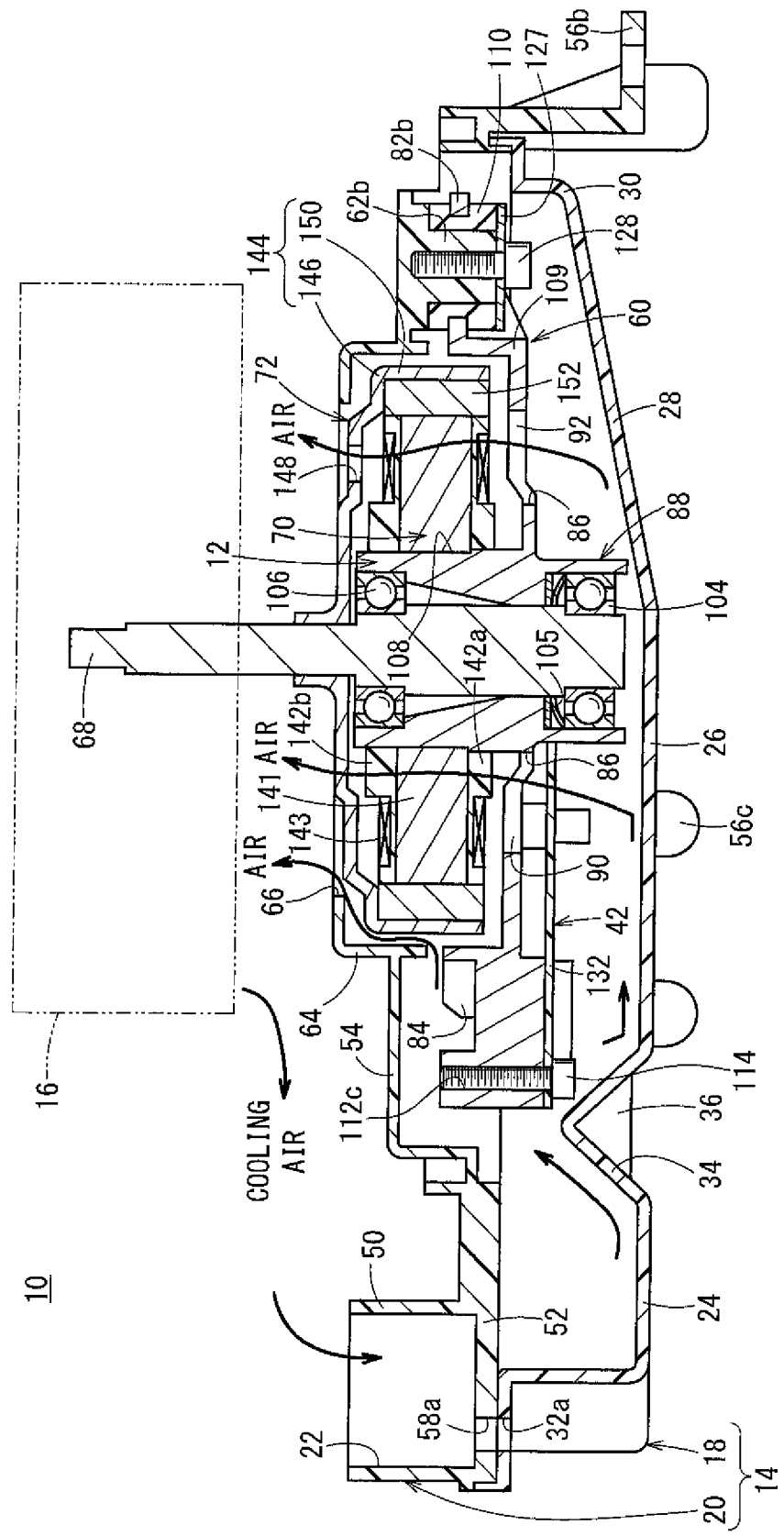
FIG. 2 is a schematic vertical cross-sectional view of the air conditioner blower motor unit shown in FIG. 1.
Figure 3:
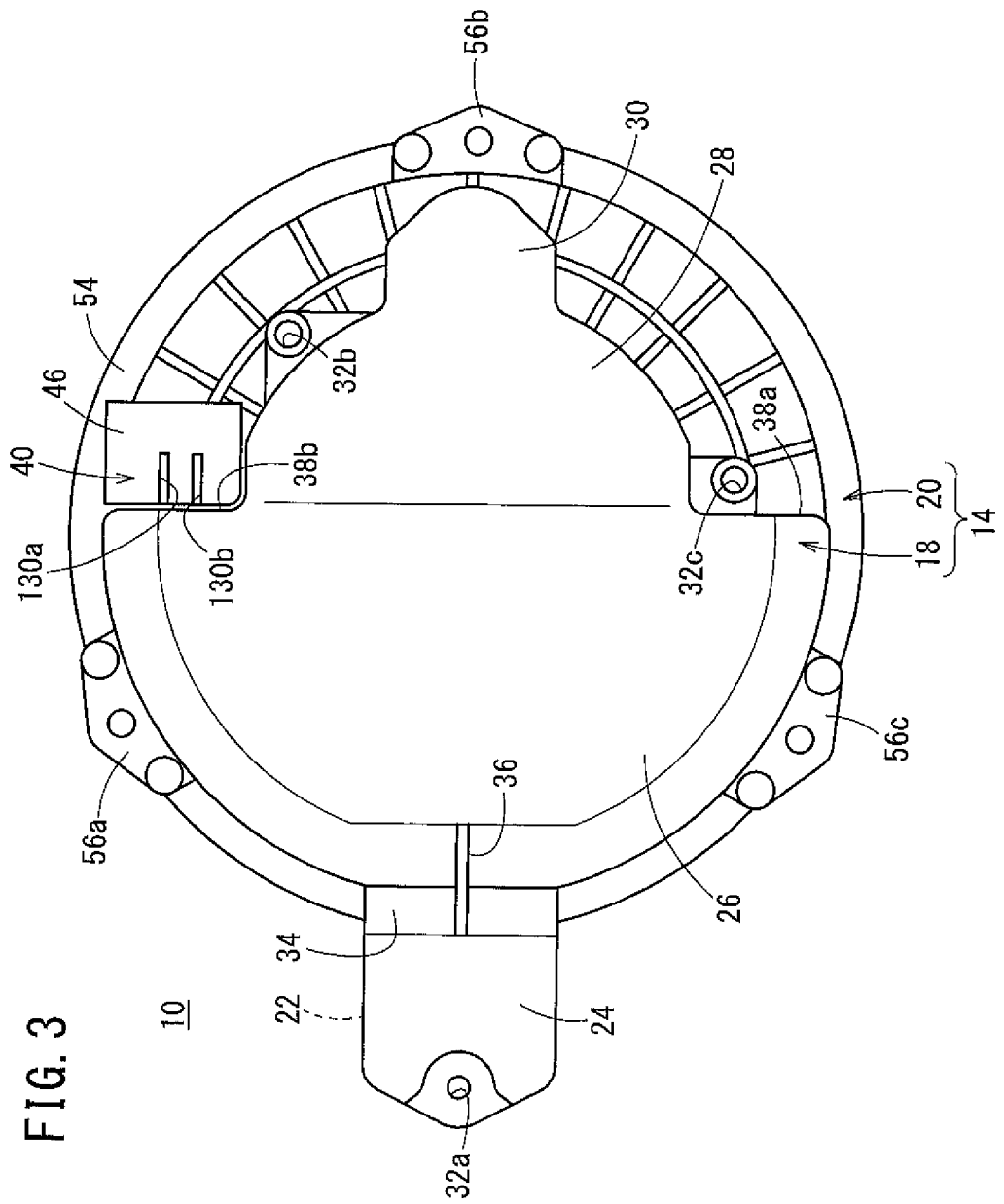
FIG. 3 is a schematic bottom view of the air conditioner blower motor unit shown in FIG. 1.

FIGS. 1 through 3 are, respectively, a schematic overall perspective view, a vertical cross-sectional view, and a schematic bottom view of an air conditioner blower motor unit 10 according to an embodiment of the present invention. The air conditioner blower motor unit 10 includes a brushless motor 12, and a casing 14 in which the brushless motor 12 is accommodated. A blower fan 16, which is indicated by an imaginary line in FIG. 2, is attached to a rotating shaft 68 of the brushless motor 12.

The casing 14 is constituted by combining a lower side half body 18 (second casing member) and an upper side half body 20 (first casing member) both of which are made from a resin material. The lower side half body 18 is a hollow body having an opening on a side thereof that faces toward the upper side half body 20, whereas the upper side half body 20 is a hollow body having an opening on the side thereof that faces toward the lower side half body 18 (in particular, see FIG. 2). More specifically, the lower side half body 18 constitutes a bottom part, and the upper side half body 20 constitutes a ceiling part. Consequently, the casing 14 also is constituted as a hollow body. In this instance, the hollow interior of the lower side half body 18 forms a second flow passage through which a cooling air (an air) introduced from the air introduction port 22 flows, and the hollow interior of the upper side half body 20 forms a first flow passage through which the air flowed from the second flow passage. In this instance, the cooling air flow is generated by the rotating blower fan 16.

The lower side half body 18 is constituted by a straight portion 24, a large semicircular portion 26, a small semicircular portion 28, and a projecting portion 30, which are joined in a continuous manner from the left side to the right side of FIG. 3. Screw insertion holes 32a to 32c are formed in the straight portion 24 and the small semicircular portion 28, through which there are passed non-illustrated connecting screws that connect the lower side half body 18 to the upper side half body 20. The screw insertion hole 32a of the straight portion 24 is formed at a position that does not hinder the flow of the cooling air. Further, the screw insertion hole 32b is formed with a slight phase difference with respect to the screw insertion hole 32c that is formed in the vicinity of the boundary between the small semicircular portion 28 and the large semicircular portion 26, so as not to interfere with a later-described coupler 40.

In the straight portion 24, a bottom wall portion is bent toward the upper side half body 20, thereby forming a protrusion 34 having a substantially inverted V shape. More specifically, two individual side parts of the protrusion 34 are inclined portions. As will be discussed later, the protrusion 34 functions as a guide member for guiding the cooling air.

As shown in FIGS. 2 and 3, a substantially triangular shaped rib 36 is bridged across on an outer wall of the two inclined portions that make up the protrusion 34. In fact, the rib 36 is disposed at a location corresponding to an outer surface of the protrusion 34 on the outer wall of the lower side half body 18.

The large semicircular portion 26 is larger in diameter than the small semicircular portion 28, and shares a chord with the small semicircular portion 28 (see FIG. 3). Therefore, at the boundary of the large semicircular portion 26 and the small semicircular portion 28, stepped parts 38a, 38b are provided along the direction of a secant line. The screw insertion hole 32c is formed at the stepped part 38a. On the other hand, at the stepped part 38b, the coupler 40 is exposed, which provides an electrical connection for a non-illustrated harness. More specifically, the coupler 40 is disposed adjacent to the lower side half body 18.

The coupler 40 is constituted by a coupler housing 46 and a plurality bus bars (four bus bars 44a, 44b, 44c, and 44d in the present embodiment) which are provided onto the circuit substrate 42 (see FIGS. 2 and 6) that is accommodated in the large semicircular portion 26. In addition, the plurality bus bars are entered into the interior of a coupler housing 46. Other details concerning the coupler 40 will be discussed later.

On the other hand, as shown in FIG. 2, the upper side half body 20 includes a hollow tubular member 50 having the air introduction port 22 formed therein, a first lid portion 52 continuous with the tubular member 50 so as to form a substantially L-shaped section therewith that closes an upper opening of the straight portion 24, and a second lid portion 54 that closes upper openings of the large semicircular portion 26 and the small semicircular portion 28. The second lid portion 54 is substantially circular shaped when viewed in plan, and on a peripheral edge thereof, stays 56a to 56c are formed to connect the air conditioner blower motor unit 10 to a predetermined member (not shown). Specifically, stays 56a, 56b, and 56c radially projecting out from the peripheral edge of the second lid portion 54 at roughly 120-degrees intervals.

Screw holes 58a to 58c are provided therein at locations corresponding to the screw insertion holes 32a to 32c. More specifically, shank portions of connecting screws, which are passed respectively through the screw insertion holes 32a to 32c of the lower side half body 18, are screw-engaged with the screw holes 58a to 58c of the upper side half body 20. Consequently, the casing 14 is constituted by connecting the lower side half body 18 and the upper side half body 20. Further, in the second lid portion 54, screw-engagement bosses 62a to 62c (screw-engagement sections) are provided in which screw holes are formed for the purpose of supporting the support plate 60.

An annular protrusion 64 is formed to protrude upwardly in a central part of the second lid portion 54. A somewhat large diameter rotating shaft insertion opening 66 is formed in the annular protrusion 64. The rotating shaft 68 of the brushless motor 12 is exposed from the rotating shaft insertion opening 66. On the other hand, a stator 70 and a rotor 72 that make up the brushless motor 12, and the circuit substrate 42, etc., that controls the brushless motor 12 are accommodated together with the support plate 60 into the casing 14.

Figure 4:
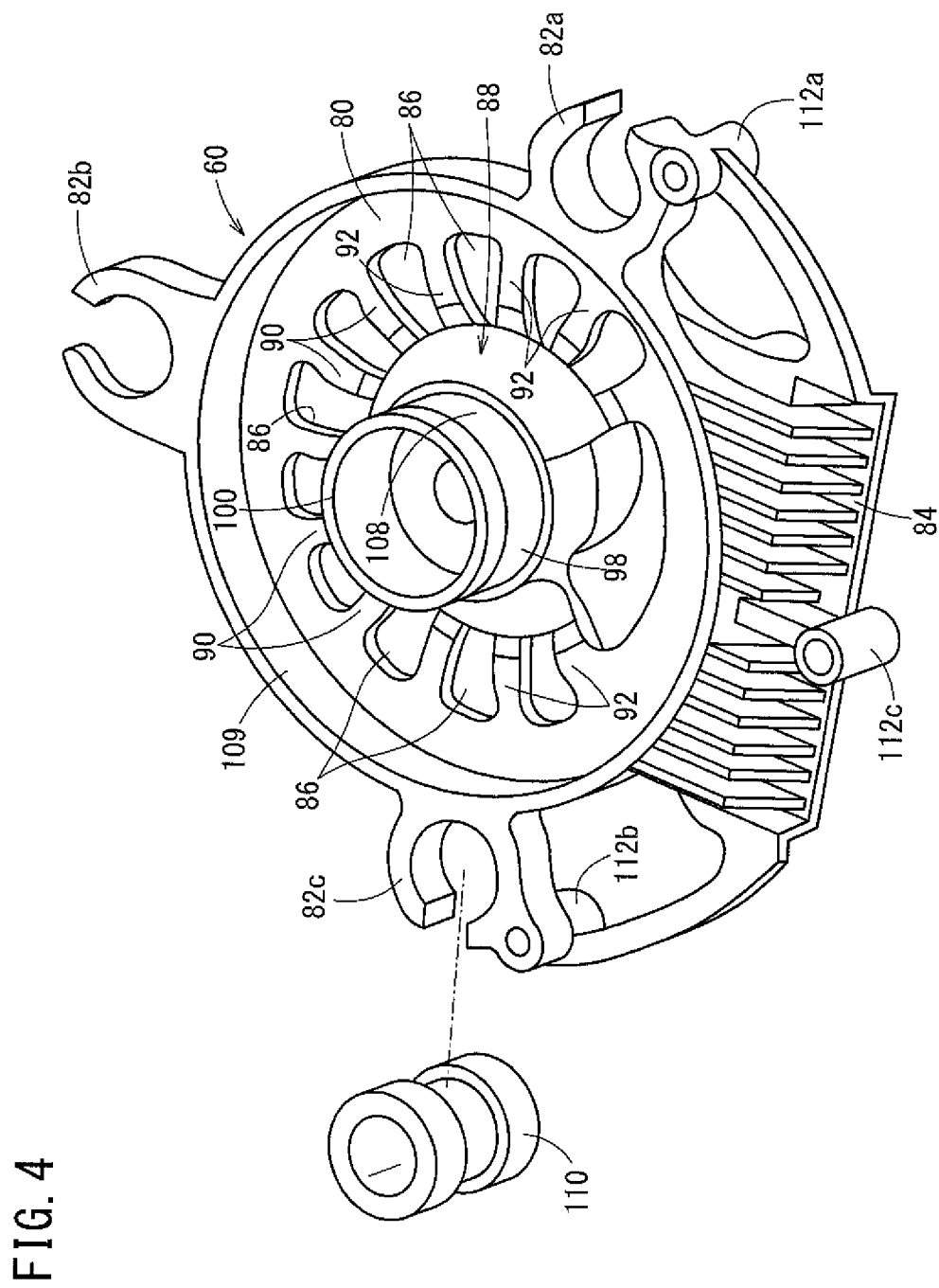
FIG. 4 is a schematic overall perspective view of a support plate that constitutes part of the air conditioner blower motor unit.

A schematic overall perspective view of the support plate 60 is shown in FIG. 4. The support plate 60 is constituted from a metal material, and is including a disk shaped part 80 and three individual rubber retaining sections 82a to 82c in the form of tongue portions. Three rubber retaining sections 82a to 82c are projecting out from an outer circumferential edge of the disk shaped part 80, and these are radially provided by roughly 120-degrees intervals. Further, a heat sink 84 is disposed between the rubber retaining sections 82a and 82c.

The disk shaped part 80 has a thin-walled plate shape in which a plurality of ventilation holes 86 (slits) are formed in a radiating manner. Between adjacently disposed ventilation holes 86, 86, spokes 90 are arranged in a radiating manner around a later-described bearing member 88. As can be easily comprehended from FIG. 2, the spokes 90 are provided with dihedral angles 92 which are upwardly raised to make a space between the circuit substrate 42 and the spokes 90. The dihedral angles 92 are arranged at a position slightly spaced from the bearing member 88 toward the outer edge portion. More specifically, the dihedral angles 92 are raised in a direction toward the upper side half body 20.

Figure 5:
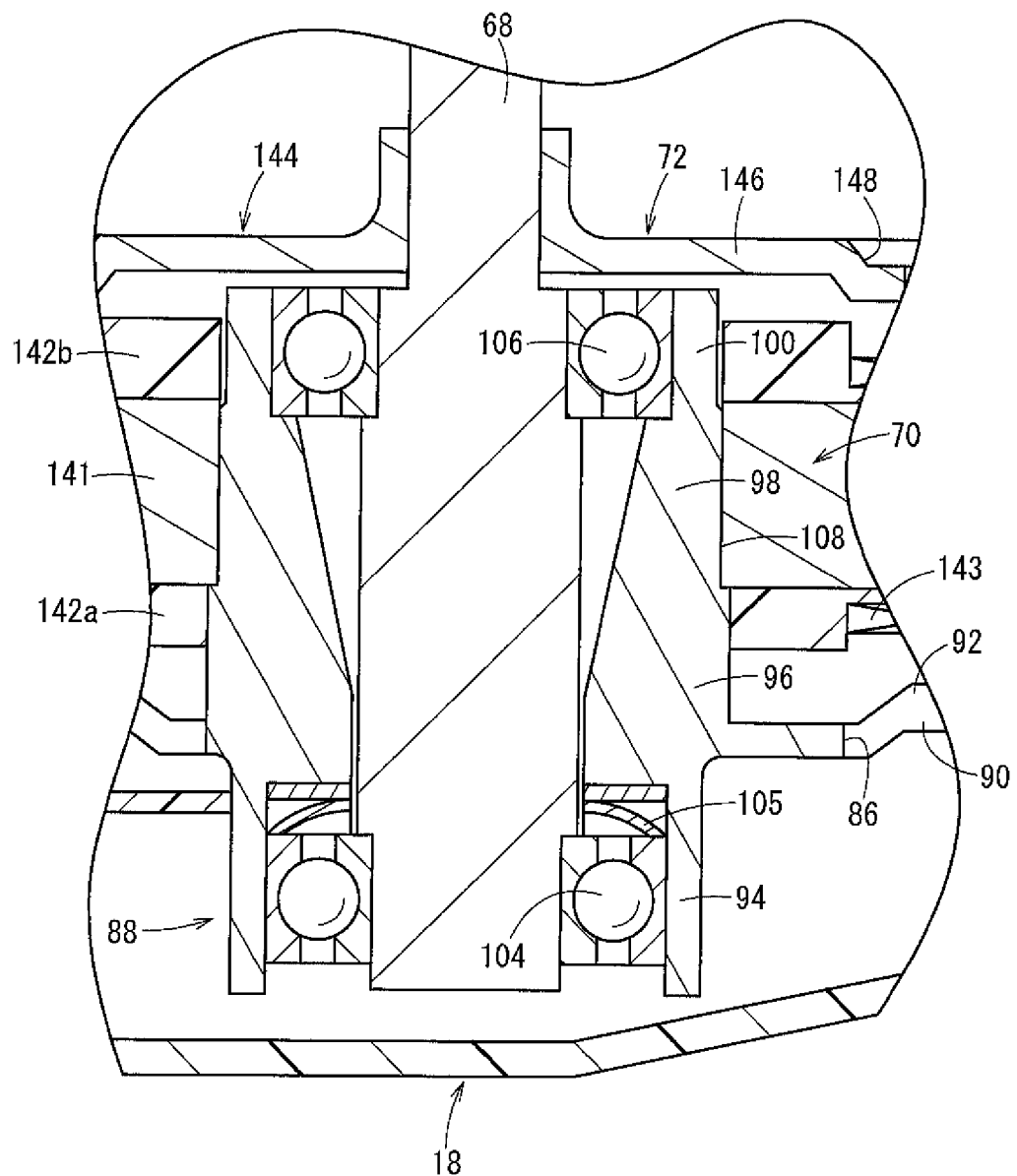
FIG. 5 is an enlarged vertical cross-sectional view of the vicinity of a bearing member of the support plate that constitutes part of the air conditioner blower motor unit shown in FIG. 1.

The cylindrically shaped bearing member 88 is disposed in a central part of the disk shaped part 80. The rotating shaft 68 of the brushless motor 12 is supported rotatably by the bearing member 88 (see FIG. 2). In this instance, as shown at an enlarged scale in FIG. 5, the bearing member 88 includes, in this order from a lower end side part thereof facing toward the lower side half body 18, a first bearing accommodating section 94 having a small outer diameter, a minimum inner diameter section 96, an expanding inner diameter section 98, and a second bearing accommodating section 100. The mutual inner diameters of the first bearing accommodating section 94 and the second bearing accommodating section 100 are substantially equivalent, whereas the inner diameters of the minimum inner diameter section 96 and the expanding inner diameter section 98 differ from the first bearing accommodating section 94 and the second bearing accommodating section 100. In this manner, the inner diameter of the bearing member 88 varies along the axial direction of the bearing member 88.

The inner diameter of the first bearing accommodating section 94 has an equivalent diameter which can be accepting an outer ring of the first bearing 104 in the vertical direction (axial direction). A first bearing 104 is slidably inserted into the first bearing accommodating section 94, and a wave washer 105 is clamped and held by the outer ring of the first bearing 104. Further, the inner diameter of the minimum inner diameter section 96 has a constant diameter that is set to be the smallest diameter in the bearing member 88. More specifically, the bearing member 88 is maximally thick-walled at the minimum inner diameter section 96, and consequently, the clearance between an inner circumferential wall of the minimum inner diameter section 96 and a side circumferential wall of the rotating shaft 68 is minimized. Moreover, the spokes 90 are joined to the outer circumferential wall of the minimum inner diameter section 96.

An expanding inner diameter section 98 is formed continuously therewith above the minimum inner diameter section 96. In the expanding inner diameter section 98, the inner diameter thereof widens in a tapered fashion in a direction away from the lower side half body 18 (approaching the upper side half body 20). More specifically, in the expanding inner diameter portion 98, the inner circumferential wall thereof gradually separates away from the side circumferential wall of the rotating shaft 68 as it approaches the upper side half body 20. Consequently, the second bearing accommodating section 100 which is joined to a thin-walled side of the expanding inner diameter section 98 is more flexible in comparison with the other sections and exhibits a comparatively large elasticity.

A second bearing 106 is press-fitted into the second bearing accommodating section 100. The inner diameter of the second bearing accommodating section 100 has a constant diameter that is adapted for the press-fitting with an outer ring of the second bearing 106. With the second bearing accommodating section 100, since the elasticity thereof is large as noted above, press-fitting of the second bearing 106 therein is easily performed. Moreover, after press-fitting, the second bearing 106 is urged resiliently toward the side of the rotating shaft 68 under an elastic action of the second bearing accommodating section 100. Consequently, the inner ring of the second bearing 106 presses the outer circumferential wall of the rotating shaft 68 in a substantially uniform manner.

A press-fitting concave portion 108, over which a portion of the stator 70 that makes up the brushless motor 12 is press-fitted, is recessed inwardly in a diametrical direction on an outer circumferential wall of the expanding inner diameter section 98. As shown in FIG. 2, the second bearing accommodating section 100 is disposed at a position separated (offset) from the stator 70, which is press-fitted onto the press-fitting concave portion 108, in an axial direction of the bearing member 88.

As shown in FIG. 4, in the vicinity of the bearing member 88, a plurality of ventilation holes 86 (slits) are formed, which extend in a radiating manner from an inner circumferential side to an outer circumferential side. It is a matter of course that the ventilation holes 86 penetrate in a vertical direction (in the thickness direction of the disc shaped part 80).

An annular member 109 is formed on a peripheral edge of the disk shaped part 80. The rubber retaining sections 82a to 82c and the heat sink 84 project out from the outer circumferential wall of the annular member 109 (the outer peripheral edge of the disk shaped part 80).

The rubber retaining sections 82a to 82c form annular shapes in which a portion of the arc thereof is cut out, and thus, are substantially C-shaped as viewed in plan. Small-diameter middle portions of the cylindrical rubber members 110 are inserted respectively into each of the rubber retaining sections 82a to 82c. Due to insertion thereof, the cylindrical rubber members 110 are retained in the rubber retaining sections 82a to 82c. Large diameter lower end and upper end portions of the cylindrical rubber members 110 are exposed from the rubber retaining sections 82a to 82c.

The heat sink 84 is a heat dissipating member having a large surface area formed by a plurality of fins erected thereon. More specifically, heat from the circuit substrate 42, which is transmitted to the support plate 60, is effectively dissipated by the heat sink 84. The support plate 60 is accommodated in the casing 14 with a posture in which a lower surface of the heat sink 84 faces toward the protrusion 34, and the fins face toward the upper side half body 20.

Screw-engagement bosses 112a to 112c are formed in the rubber retaining sections 82a, 82c and the heat sink 84. Screw holes are formed in each of the screw-engagement bosses 112a to 112c. Supporting screws 114 (see FIG. 2) for attaching the circuit substrate 42 to the support plate 60 are screw-engaged in the screw holes. Further, a phase difference between the screw-engagement boss 112c formed in the heat sink 84 and the rubber retaining section 82b is set to roughly 180°.

The disk shaped part 80, the bearing member 88, the annular member 109, the rubber retaining sections 82a to 82c, the heat sink 84, and the screw-engagement bosses 112a to 112c are joined together integrally to thereby make up the support plate 60. Thus, the support plate 60 is a single member including the disk shaped part 80, the bearing member 88, the annular member 109, the rubber retaining sections 82a to 82c, the heat sink 84, and the screw-engagement bosses 112a to 112c. The support plate 60, which is configured in this manner, can be obtained as a cast product made of, for example, an aluminum alloy. In addition, the support plate 60 is spaced at a predetermined distance with respect to the inner wall of the casing 14 including the protrusion 34.

Further, the screw-engagement bosses 62a to 62c (see especially FIG. 6), which are provided on the upper side half body 20, are inserted into the cylindrical rubber members 110 which are held in the rubber retaining sections 82a to 82c. In other words, the cylindrical rubber members 110 are fitted over the screw-engagement bosses 62a to 62c. At this time, the screw-engagement bosses 62a to 62c are embedded completely inside the cylindrical rubber members 110 (see FIG. 2).

In this state, connecting screws 128 (threaded members) are screw-engaged in screw holes of the screw-engagement bosses 62a to 62c with washers 127 interposed therebetween. Accompanying such screw-engagement, the cylindrical rubber members 110 are compressed a predetermined amount in the vertical direction by the washers 127. As a result, the cylindrical rubber members 110 are interposed between the washers 127 and the screw-engagement bosses 62a to 62c (the upper side half body 20), respectively.

Figure 6:
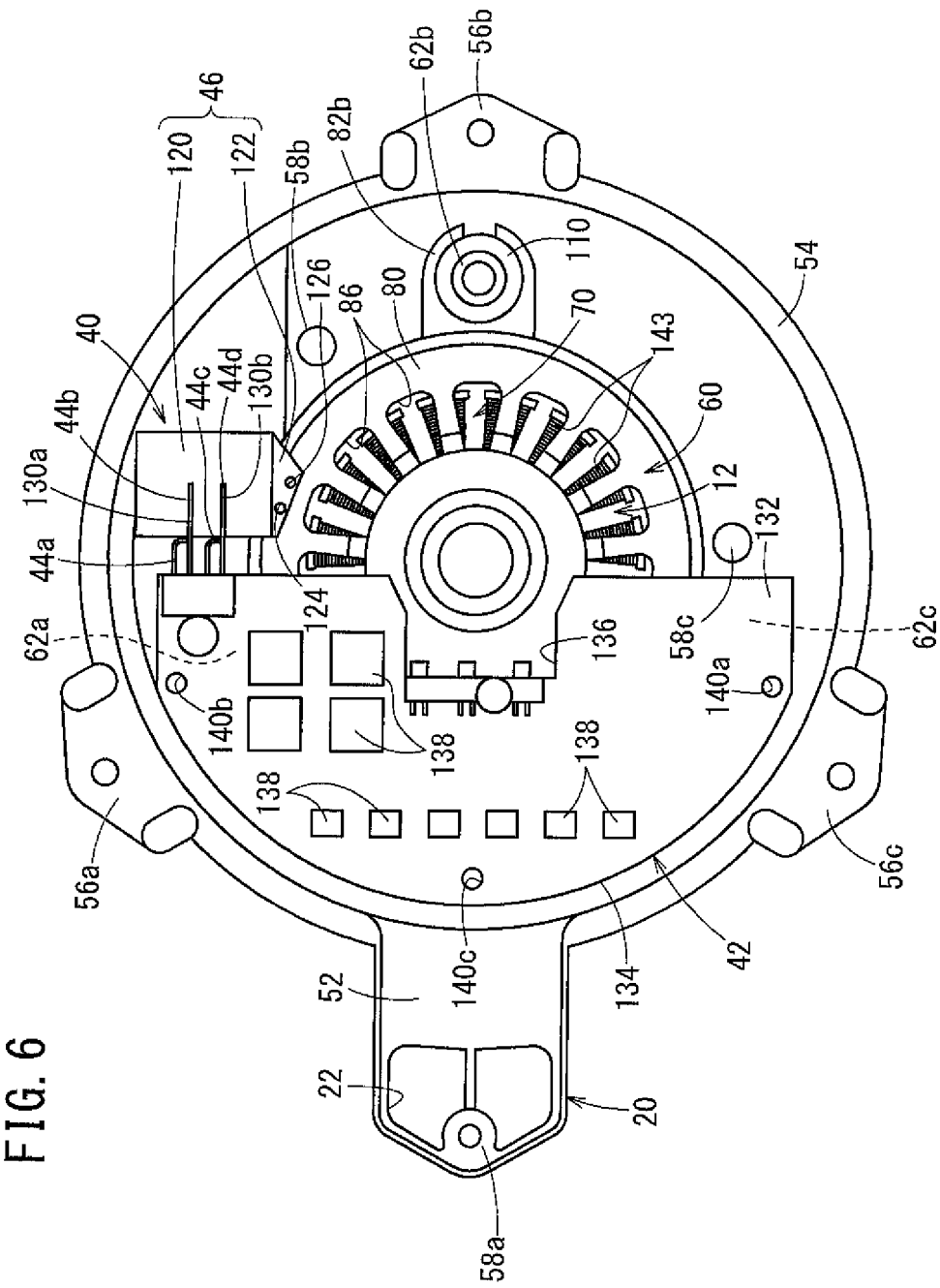
FIG. 6 is a schematic bottom view in which illustration is omitted of a lower side half body that makes up the air conditioner blower motor unit.

The coupler housing 46 constituting the coupler 40 is positioned and fixed in the vicinity of an outer edge portion of the disk shaped part 80. More specifically, as shown in FIG. 6, in which illustration of the lower side half body 18 is omitted, the coupler housing 46 includes a leg 122 that projects out from a main body portion 120 thereof toward the disk shaped part 80. Screw holes 124 having non-illustrated blocking stepped parts therein are formed to penetrate through the leg 122. In addition, fixing screws 126, which are passed through the screw holes 124, are screw-engaged in screw holes (not shown) formed in the disk shaped part 80, whereby the coupler housing 46 is connected to the support plate 60. The heads of the fixing screws 126 are blocked by the blocking stepped parts.

The main body portion 120 is a hollow body in which an inner chamber (not shown) is formed. Two slits 130a, 130b (see FIGS. 3 and 6) are formed that penetrate the lower end surface of the main body portion 120. More specifically, the slits 130a and 130b start from the lower end surface and reach through to the inner surface that faces the inner chamber.

The coupler housing 46, which is constructed as described above, is made from resin of an insulating material. The above-described four bus bars 44a to 44d are accommodated in the inner chamber of the main body portion 120. The bus bars 44a to 44d are configured to protrude from the circuit substrate 42 at the time that the circuit substrate 42 is manufactured. As will be described later, when the circuit substrate 42 is supported by the support plate 60, the bus bars 44a to 44d pass through the slits 130a, 130b and are inserted into the inner chamber of the main body portion 120.

In this instance, as shown in FIG. 6, the circuit substrate 42 is of a substantially semicircular shape having a straight section 132 and a curved arcuate section 134. The straight section 132 faces toward the side of the rotating shaft 68 (the bearing member 88). In the straight section 132, a relief part 136, which is of a shape recessed in a substantially quadrangular form in a direction toward the curved arcuate section 134, is formed so as to avoid interfering with the bearing member 88. More specifically, as viewed in plan, the circuit substrate 42 does not overlap with the rotating shaft 68 or the bearing member 88, and also the circuit substrate 42 does not surround the rotating shaft 68 or the bearing member 88.

Various electronic components 138, such as a capacitor, a resistor, a switching element, etc., are disposed on the circuit substrate 42, thereby constituting a control circuit. The control circuit performs a control so as to control the rotational speed or the like of the rotating shaft 68.

Supply of current to electrically energize the control circuit is carried out through the bus bars 44a to 44d provided on the circuit substrate 42. The bus bar 44a projects out both alongside and downwardly, respectively, of the bus bar 44b that protrudes and extends linearly from the straight section 132 of the circuit substrate 42, and after being bent, overlaps vertically therewith as viewed in plan. The bus bars 44a, 44b are separated mutually by a predetermined distance. Similarly, the remaining bus bars 44c, 44d overlap each other vertically as viewed in plan while being separated by a predetermined distance.

Supporting screw insertion holes 140a to 140c are formed in the circuit substrate 42. The supporting screws 114 are passed respectively through the supporting screw insertion holes 140a to 140c, together with the supporting screws 114 being screw-engaged into respective screw holes of the screw-engagement bosses 112a to 112c of the support plate 60. As a result of such screw engagement, the circuit substrate 42 is supported on the support plate 60. The circuit substrate 42 is supported indirectly by the casing 14 via the support plate 60, but is not connected directly to the casing 14.

Figure 7:
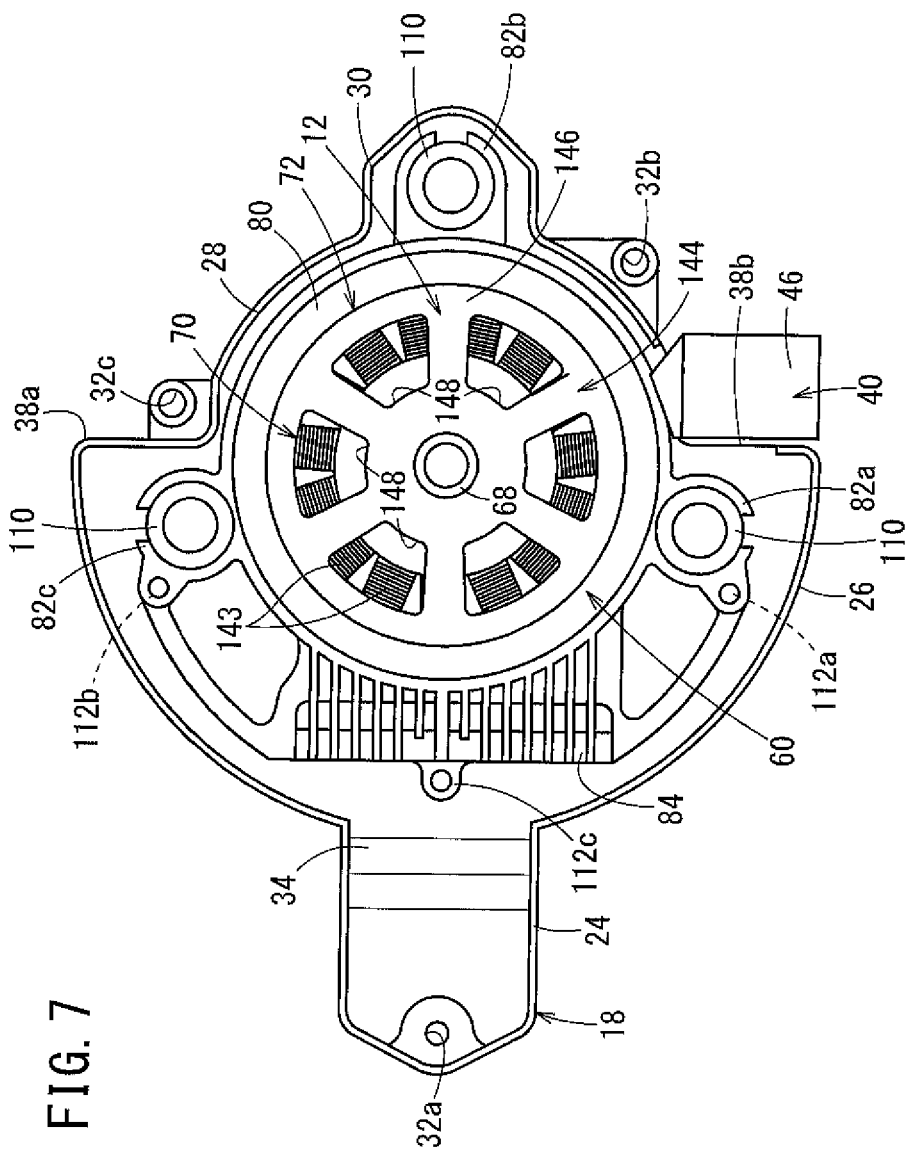
FIG. 7 is a schematic plan view in which illustration is omitted of an upper side half body that makes up the air conditioner blower motor unit.

As shown in FIGS. 2 and 6, and in FIG. 7 in which illustration of the upper side half body 20 is omitted, the brushless motor 12 includes the stator 70, which is positioned and fixed on the bearing member 88, the rotating shaft 68 rotatably supported in the bearing member 88, and the rotor 72 which is attached to the rotating shaft 68. Among these features, the stator 70 is equipped with a stacked core 141 having a yoke and teeth, a pair of insulators 142a, 142b sandwiching the stacked core 141 from above and below, and electromagnetic coils 143 that are wound on the teeth of the stacked core 141 through the insulators 142a, 142b.

The yoke that makes up the stacked core 141 has an annular shape on an inner circumferential side of the stacked core 141. On the other hand, the teeth protrude in a radiating manner outward in diametrical directions from the yoke portion, so as to substantially form a T-shape. The teeth face toward an inner circumferential wall (side wall portion 150) of a rotary disc 144 constituting the rotor 72. More specifically, in this case, the brushless motor 12 is a so-called outer rotor type in which the rotor 72 is positioned on an outer side of the stator 70. Such a configuration is well known, and therefore, detailed description of this feature is omitted.

The annular shaped yoke that constitutes the stacked core 141 is press-fitted into the press-fitting concave portion 108 formed on the outer circumferential wall of the bearing member 88. Accompanying such press-fitting, the stator 70 is firmly positioned and fixed to the bearing member 88.

On the other hand, the adjacently arranged teeth (electromagnetic coils 143) are separated mutually by a predetermined distance. More specifically, clearances are formed mutually therebetween. The clearances serve as passages through which the cooling air passes.

The rotor 72 includes a cup-shaped rotary disc 144 which is supported by the rotating shaft 68, which is rotatably inserted in the bearing member 88 of the support plate 60. The rotary disc 144 is cup-shaped, and a circular bottom face 146 thereof faces upwardly. In addition, the circular bottom face 146 is exposed from the rotating shaft insertion opening 66 formed in the annular protrusion 64 of the upper side half body 20, together with the rotating shaft 68. A slight clearance is formed between the circular bottom face 146 and the annular protrusion 64. Furthermore, in the circular bottom face 146, a plurality of substantially trapezoidal ventilation openings 148 are formed in facing relation to the teeth (electromagnetic coils 143).

The lower end of a side wall portion 150, which is bent in a downwardly hanging manner from the circular bottom face 146, is inserted into the annular member 109 of the support plate 60. On an inner surface of the side wall portion 150, a plurality of permanent magnets 152 are supported in facing relation to the teeth of the stator 70. When the rotating shaft 68 and the rotary disk 144 undergo rotation, the permanent magnets 152 are also rotated integrally with the rotary disk 144.

The air conditioner blower motor unit 10 according to the present embodiment is constructed basically in the manner described above. Next, operations and effects thereof will be described.

When the circuit substrate 42 is attached to the support plate 60 in order to assemble the air conditioner blower motor unit 10, for example, at first, a central end portion of the annular yoke of the stator 70 is press-fitted into the press-fitting concave portion 108 formed in the bearing member 88 of the support plate 60. Furthermore, together with insertion of the rotating shaft 68 into the bearing member 88, each of the first bearing 104 and the second bearing 106 are externally fitted over the rotating shaft 68.

At this time, the first bearing 104 is inserted slidably in the first bearing accommodating section 94, such that the wave washer 105 is interposed from below the bearing member 88. Further, the second bearing 106 is press-fitted into the second bearing accommodating section 100 from above the bearing member 88. In accordance with the above, a predetermined bearing pressure is applied to the first bearing 104 and the second bearing 106.

Next, the rotary disk 144 is press-fitted and fixed from above the rotating shaft 68. As a result, the permanent magnets 152, which constitute the rotor 72 by being supported on the inner surface of the side wall portion 150 of the rotary disk 144, are arranged in facing relation to the stacked core 141 of the stator 70.

In this instance, concerning the second bearing accommodating section 100, the elasticity thereof is large as noted above. For this reason, it is easy for the second bearing accommodating section 100 to undergo expansion when the second bearing 106 is press-fitted therein. Therefore, the press-fitting operation is easy to perform. Moreover, after press-fitting, since the second bearing accommodating section 100 generating a load based on a restoring force which restores the original shape prior to press-fitting, the rotating shaft 68 and the second bearing 106 are pressed and urged to the center of the bearing member 88. Consequently, the inner ring of the second bearing 106 presses the outer circumferential wall of the rotating shaft 68 in a substantially uniform manner. Accordingly, the axial centers of the rotating shaft 68 and the bearing member 88 match one another with high precision.

As described above, when the second bearing 106 is press-fitted, the second bearing accommodating section 100 undergoes expansion, however, the expanding inner diameter section 98 does not expand so much. Consequently, it is unlikely for any influence to be imparted to the press-fitting concave portion 108 that is formed on the outer circumferential wall of the expanding inner diameter portion 98, and the stacked core 141 (stator 70) that is press-fitted into the press-fitting concave portion 108. More specifically, according to the present embodiment, although a configuration is adopted in which the second bearing 106 is easily accommodated in the second bearing accommodating section 100, due to the second bearing accommodating section 100 and the expanding inner diameter section 98 being offset along the axial direction of the bearing member 88, it is also easy to press-fit the stacked core 141 into the press-fitting concave portion 108.

Further, the dihedral angles 92 are provided in the spokes 90 of the support plate 60. More specifically, portions of the spokes 90 are bent toward the upper side half body 20, and by such an amount, a gap is formed below the dihedral angles 92. The electronic components 138 provided on the circuit substrate 42 enter into the gap. Consequently, together with reducing a so-called dead space between the support plate 60 and the circuit substrate 42, the interval between the support plate 60 and the circuit substrate 42 can be minimized.

Next, the coupler housing 46 that makes up the coupler 40 is connected to the support plate 60. For this purpose, the fixing screws 126 are passed through the screw holes 124 formed in the leg 122, and the fixing screws 126 may be screwed-engaged into threaded holes for the fixing screws that are formed in the disk shaped part 80 of the support plate 60. Screw-engagement of the fixing screws 126 is stopped when the fixing screws 126 are blocked by the blocking stepped parts of the screw holes 124.

Next, the bus bars 44a to 44d that project out from the straight section 132 of the circuit substrate 42 are passed through the slits 130a, 130b formed on the lower end surface of the coupler housing 46, and are accommodated in the inner chamber of the coupler housing 46. Since the bus bars 44a, 44b overlap each other and the bus bars 44c, 44d overlap each other as viewed in plan, the bus bars 44a, 44b pass through the slit 130a, whereas the bus bars 44c, 44d pass through the slit 130b. In this manner, according to the present embodiment, the bus bars 44a to 44d can easily be accommodated in the coupler housing 46 that is supported by the support plate 60. In this instance, it is easy to construct the coupler 40.

In addition, since the coupler housing 46 is disposed on the support plate 60, a sufficiently large installation space for the electronic components 138 on the circuit substrate 42 is ensured. For this reason, a so-called dead space is unlikely to occur on the circuit substrate 42. Moreover, the coupler 40 does not overlap with the rotating shaft 68 as viewed in plan. In view of the above point, together with the point that the interval between the support plate 60 and the circuit substrate 42 can be minimized, it is possible for the circuit substrate 42 and the air conditioner blower motor unit 10 to be made small in scale.

Furthermore, since the coupler 40 is arranged adjacent to the lower side half body 18, the coupler 40 lies within a thickness range of the lower side half body 18. Therefore, enlargement in the thickness direction of the casing 14 is avoided.

On the other hand, the supporting screws 114, which are passed respectively through the supporting screw insertion holes 140*a* to 140*c* of the circuit substrate 42, are screw-engaged into the screw holes that are formed respectively in the screw-engagement bosses 112*a* to 112*c*. Consequently, the circuit substrate 42 is supported on the support plate 60 through the supporting screws 114.

The assembly of the brushless motor 12, the circuit substrate 42, and the support plate 60, which is obtained in the manner described above, is assembled into the upper side half body 20. More specifically, the screw-engagement bosses 62*a* to 62*c*, which are provided on the upper side half body 20, are inserted into the hollow interiors of the cylindrical rubber members 110 which are placed in advance and held in the substantially C-shaped rubber retaining sections 82*a* to 82*c*. As a result, together with the cylindrical rubber members 110 being fitted over the screw-engagement bosses 62*a* to 62*c*, the screw-engagement bosses 62*a* to 62*c* are embedded completely inside the cylindrical rubber members 110 (see FIG. 2). At the same time, the rotating shaft 68 and the circular bottom face 146 of the rotary disk 144 are exposed from the rotating shaft insertion opening 66 of the upper side half body 20.

In addition, the connecting screws 128 are screw-engaged in screw holes of the screw-engagement bosses 62*a* to 62*c* with the washers 127 interposed therebetween. Along therewith, the cylindrical rubber members 110 are compressed by the washers 127, and a state is brought about in which the cylindrical rubber members 110, which exhibit elasticity, are gripped by the rubber retaining sections 82*a* to 82*c*, and are interposed, respectively, between the washers 127 and the screw-engagement bosses 62*a* to 62*c* (the upper side half body 20). Except for the above, structure is not provided in particular for supporting the support plate 60. Accordingly, the support plate 60 is supported in a floating manner with respect to the upper side half body 20 (casing 14) under an elastic action of the cylindrical rubber members 110. Moreover, the circuit substrate 42 is supported indirectly by the upper side half body 20 via the support plate 60, and is not connected directly to the upper side half body 20.

Next, the connecting screws are passed respectively through the screw insertion holes 32*a* to 32*c* formed in the lower side half body 18, and furthermore, the connecting screws are screw-engaged with the screw holes 58*a* to 58*c* formed in the upper side half body 20. Consequently, the lower side half body 18 and the upper side half body 20 are connected, and the casing 14 is constructed in which the assembly (the circuit substrate 42, the support plate 60, and the brushless motor 12) is accommodated therein. Furthermore, the air conditioner blower motor unit 10 is obtained by attaching the blower fan 16 (see FIG. 2) to the rotating shaft 68.

As described above, because the circuit substrate 42 is located at an offset position that does not overlap with the rotating shaft 68 (or the bearing member 88) as viewed in plan, it is possible to avoid an increase in the dimension of the casing 14 in the vertical direction (thickness direction). Owing to this feature as well, a reduction in size of the air conditioner blower motor unit 10 can easily be realized.

The air conditioner blower motor unit 10 is incorporated in a vehicular air conditioning device mounted in a vehicle body. At this time, together with the fixing screws being passed through the stays 56*a* to 56*c*, the fixing screws are screw-engaged in a predetermined member, for example, a scroll-shaped fan casing (not shown) surrounding the blower fan 16. Further, a harness on the side of the vehicle body is electrically connected to the coupler 40. At this time, since a harness side coupler housing is inserted into the coupler housing 46, the slits 130*a*, 130*b* are closed by the harness side coupler housing. Accordingly, the bus bars 44*a* to 44*d* are prevented from being exposed from the coupler housing 46.

When the vehicular air conditioning device is driven, electrical current is supplied from the harness to the control circuit through the bus bars 44*a* to 44*d*. Further, under the control of the control circuit, the electromagnetic coils 143 are also energized through the various electronic components 138 such as a capacitor, a resistor, a switching element, etc., thereby generating an alternating magnetic field in the stator 70. Attraction and repulsion take place continuously between the alternating magnetic field and the magnetic fields created by the permanent magnets 152 that make up the rotor 72, whereby the rotary disc 144 rotates. Integrally therewith, the rotating shaft 68 and the blower fan 16 undergo rotation.

Furthermore, along with current being supplied to the control circuit, the electronic components 138 and the circuit substrate 42 take on heat. Such heat is transferred to the support plate 60 and arrives at the heat sink 84 of the support plate 60. In this instance, the neighborhood of the heat sink 84 is kept in close contact with the circuit substrate 42 by the supporting screw 114 that is screw-engaged in the screw-engagement boss 112*c*. Accordingly, heat from the electronic components 138 and the circuit substrate 42 is transferred rapidly to the heat sink 84.

Since the blower fan 16 undergoes rotation, the air around the periphery of (particularly above) the blower fan 16 blows into the fan casing (not shown) and becomes an air flow oriented in a centrifugal direction of the blower fan 16, which is a centrifugal fan. A part of the air flow is introduced into the interior of the casing 14 from the air introduction port 22 formed in the tubular member 50 of the upper side half body 20, and acts as cooling air that flows past the second flow passage of the lower side half body 18, and then through the first flow passage of the upper side half body 20.

The protrusion 34 (guide member), which is convexly shaped in a direction toward the upper side half body 20, is provided in the lower side half body 18. When the cooling air flowing through the second passage comes into contact with the protrusion 34, the cooling air flows along an inclined upstream side portion of the protrusion 34. As a result, the direction in which the portion of the cooling air travels is changed toward the side of the upper side half body 20. In other words, the protrusion 34 guides a portion of the cooling air toward the side of the upper side half body 20 (the side of the first flow passage).

The part of the cooling air that has advanced to the side of the upper side half body 20 contacts the heat sink 84. Consequently, the heat sink 84 is quickly cooled. As discussed above, since the heat from the circuit substrate 42 is transferred rapidly to the heat sink 84, dissipation of heat from the circuit substrate 42 progresses efficiently through the heat sink 84. In this manner, by providing the protrusion 34 (guide member) in the casing 14, and thereby directing the cooling air toward the heat sink 84, heat from the circuit substrate 42 can easily be removed.

In addition, the heat sink 84 is disposed integrally as one portion of the support plate 60. Therefore, compared to a case of connecting a heat sink which is provided in the form of a separate member, since it is possible to increase the heat dissipating area, the circuit substrate 42 can be cooled efficiently while also achieving a reduction in size of the air conditioner blower motor unit 10.

A part of the heat that is transferred to the support plate 60 reaches the bearing member 88. Therefore, since the bearing member 88, the first bearing 104, and the second bearing 106 are heated via the support plate 60, the internal clearances of the first bearing 104 and the second bearing 106 are reduced. Consequently, even if the outside air temperature is low, backlash and rattling of the first bearing 104 and the second bearing 106 are reduced. In addition, in low temperature condition, a rise in viscosity of grease which is sealed beforehand in the first bearing 104 and the second bearing 106, also is reduced by being heated as well. Consequently, the first bearing 104 and the second bearing 106 rotate smoothly, and since the rotating shaft 68 is prevented from rotating eccentrically, vibration of the rotating shaft 68 is suppressed. As a result, quietness is enhanced.

The remaining cooling air flows over the protrusion 34 and through the interior (the second flow passage) of the lower side half body 18, whereupon the air rises toward the circuit substrate 42 and the electromagnetic coils 143, which are arranged in the first flow passage. The cooling air after having contacted with the circuit substrate 42 and the bearing member 88 passes through the ventilation holes 86 of the support plate 60, and further passes through gaps disposed between the adjacent teeth of the stacked core 141. More specifically, owing to the ventilation holes 86, the cooling air is capable of flowing from the second flow passage to the first flow passage. As a result, the circuit substrate 42, the support plate 60, and the brushless motor 12 are cooled by the cooling air together.

The cooling air is discharged to the exterior of the casing 14 via a gap between the rotating shaft insertion opening 66 of the upper side half body 20 and the rotary disk 144 of the brushless motor 12, as well as through the ventilation openings 148 formed in the rotary disk 144. Thereafter, the cooling air is recirculated in the form of an air flow from the blower fan 16 (centrifugal fan).

The rubber retaining sections 82a to 82c project from the outer peripheral edge of the disk shaped part 80, and in particular, the rubber retaining section 82b is disposed at a position having a phase difference of 180° with respect to the screw-engagement boss 112c of the heat sink 84. Therefore, the rubber retaining sections 82a to 82c are not positioned in the flow path of the cooling air. Consequently, in the course of flow of the cooling air, as described above, the cooling air hardly comes into contact with the rubber retaining sections 82a to 82c. In other words, the rubber retaining sections 82a to 82c do not obstruct the flow of the cooling air.

Accompanying rotation of the rotating shaft 68, vibrations are transmitted to the bearing member 88. In this instance, the bearing member 88 includes the minimum inner diameter section 96 to which the spokes 90 are joined. The minimum inner diameter section 96 is formed in such a manner that the inner circumferential wall of the minimum inner diameter section 96 is maximally thick-walled among the locations constituting the bearing member 88, so as to be in closer proximity to the side circumferential wall of the rotating shaft 68 than other locations of the inner circumferential wall. Moreover, in particular, since as noted above, the second bearing 106 receives an elastic force from the second bearing accommodating section 100, the side circumferential wall of the rotating shaft 68 is pressed in a substantially uniform manner along the circumferential direction thereof. For the reasons mentioned above, it is unlikely for the rotating shaft 68 to become inclined, and due to this feature as well, mechanically precession movement of the rotating shaft 68 is suppressed. Consequently, vibrations and vibratory noise are reduced and quietness becomes superior.

Even supposing that vibrations are transmitted from the bearing member 88 to the disk shaped part 80, since the rigidity of the support plate 60 is high as a result of being made from a metal material, it is unlikely for the support plate 60 to resonate. Moreover, the cylindrical rubber members 110 are interposed between the upper side half body 20 and the rubber retaining sections 82a to 82c contiguous with the disk shaped part 80. The cylindrical rubber members 110 exhibit elasticity, and thus perform a buffering action against vibrations. In addition, the support plate 60 is not directly supported on the casing 14. Therefore, vibrations are suppressed and prevented from being transmitted to the casing 14, and as a result, the casing 14 itself is prevented from resonating.

Even supposing that vibrations are transmitted to the casing 14, the rib 36 is provided on the casing 14 at a location corresponding to an outer surface of the protrusion 34. Therefore, since the rigidity of the casing 14 is secured, resonance of the casing 14 in an audible range is prevented.

Furthermore, the support plate 60 and the circuit substrate 42 are spaced at a predetermined distance away from the inner wall of the casing 14 including the protrusion 34. For this reason, even in the case that the support plate 60 or the circuit substrate 42 has vibrated or oscillated, these are not interfering with the wall portions which include the protrusion 34 because these are supported in a floating manner as mentioned above. For the reasons mentioned above, quietness is further enhanced. Further, any concerns over the occurrence of contact sounds or damage to the circuit substrate 42 are eliminated, and durability is improved.

Ultimately, according to the present embodiment, it is possible to construct a compact air conditioner blower motor unit 10, which is excellent in terms of quietness and the ability to dissipate heat.

The present invention is not limited in particular to the embodiment described above, and various modifications are possible within a range that does not depart from the essence and gist of the present invention.

For example, the protrusion 34 is not limited to being formed by bending a wall portion of the lower side half body 18. As an alternative example, a solid protuberance, which is provided in a raised manner inside the lower side half body 18, may be mentioned. In this case, since the outer wall of the lower side half body 18 is flat, there is no particular need to provide the rib 36 at a location corresponding to an outer surface of the protrusion 34.

Further, although according to the embodiment, the rubber retaining sections 82a to 82c that retain the cylindrical rubber members 110 are substantially C-shaped, the present invention is not limited to this feature. For example, the rubber retaining sections 82a to 82c may be substantially U-shaped. In this case, since they are substantially U-shaped, the cylindrical rubber members 110 can be inserted more easily into the rubber retaining sections 82a to 82c.

What is claimed is:

1. A blower motor unit for an air conditioner, comprising:
a brushless motor adapted to rotate a blower fan constituting part of an air conditioning device;
a circuit substrate on which a control circuit adapted to control the brushless motor is provided;
a support plate having a bearing member that rotatably supports a rotating shaft of the brushless motor, together with supporting the circuit substrate;
a heat dissipating member provided on the support plate and being capable of dissipating heat of the circuit substrate; and
a casing that is constituted by combining a first casing member and a second casing member, and accommodates the brushless motor, the circuit substrate, the heat dissipating member, and the support plate;

wherein an air introduction port, a rotating shaft insertion opening through which the rotating shaft is passed, and a first flow passage for causing an air introduced from the air introduction port to flow to at least the brushless motor and the heat dissipating member are formed in the first casing member;

a second flow passage through which the air introduced from the air introduction port is allowed to flow is formed in the second casing member, and a guide member that is adapted to guide the air from the second flow passage to the first flow passage is provided in the second casing member; and the guide member is a protrusion that faces toward the heat dissipating member, and protrudes toward the side of the first casing member.

2. The blower motor unit for an air conditioner according to claim 1, wherein the support plate is constituted from a metal material, and the heat dissipating member is disposed integrally with the support plate as a portion of the support plate.

3. The blower motor unit for an air conditioner according to claim 2, wherein the support plate is arranged at a position in contact with the air in the course of flowing from the air introduction port, past the guide member, and to the rotating shaft insertion opening.

4. The blower motor unit for an air conditioner according to claim 3, wherein:

the support plate includes a plurality of screw-engagement bosses in which threaded members are screw-engaged in order to attach the circuit substrate to the support plate, and a plurality of tongue portions that project from an outer edge portion of the support plate and serve to support the support plate into the casing;

at least one of the screw-engagement bosses from among the plurality of screw-engagement bosses is disposed in proximity to the heat dissipating member; and at least one of the tongue portions from among the plurality of tongue portions is disposed at a position having a 180° phase difference with respect to the screw-engagement boss located in proximity to the heat dissipating member.

5. The blower motor unit for an air conditioner according to claim 4, wherein a ventilation hole that enables the air guided by the guide member to flow from the second flow passage to the first flow passage is formed in the support plate.

6. The blower motor unit for an air conditioner according to claim 5, wherein the guide member is a protrusion that protrudes in the form of a substantially inverted V-shape toward the side of the first casing member.

7. The blower motor unit for an air conditioner according to claim 5, wherein the guide member is a solid protrusion that is disposed inside the second casing member so as to protrude toward the side of the first casing member with a triangular shape in cross section.

8. The blower motor unit for an air conditioner according to claim 5, wherein the guide member is a protrusion of a shape in which an outer wall of the second casing member is bent toward the side of the first casing member, and a rib is provided on the outer wall corresponding to an outer surface of the guide member.

9. The blower motor unit for an air conditioner according to claim 1, wherein a clearance is formed between the support plate and the casing with a distance such that the support plate does not interfere with the casing when the rotating shaft is rotated.

* * * * *